US006315086B1

United States Patent
Schmitt et al.

(10) Patent No.: US 6,315,086 B1
(45) Date of Patent: Nov. 13, 2001

(54) ELECTROMECHANICALLY OPERATED DISK BRAKE

(75) Inventors: Stefan Schmitt, Eltville; Holger Kranlich, Karben, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/508,791

(22) PCT Filed: Sep. 16, 1998

(86) PCT No.: PCT/EP98/06037

§ 371 Date: May 30, 2000

§ 102(e) Date: May 30, 2000

(87) PCT Pub. No.: WO99/14516

PCT Pub. Date: Mar. 25, 1999

(30) Foreign Application Priority Data

Sep. 16, 1997 (DE) ............................................. 197 40 867

(51) Int. Cl.[7] ..................................................... F16D 55/16
(52) U.S. Cl. .......................... 188/72.7; 188/158; 188/162; 310/77; 310/93
(58) Field of Search ................................ 188/73.31, 72.7, 188/72.8, 158, 162, 157, 71.1, 72.1; 310/77, 76, 92, 93; 74/89, 89.15, 567, 424.8 R

(56) References Cited

U.S. PATENT DOCUMENTS

| 3,744,332 | 7/1973 | Nilsson . |
| 4,884,466 | 12/1989 | Duruisseau . |
| 5,788,023 | * 8/1998 | Schoner et al. ...................... 188/72.7 |
| 6,059,076 | * 5/2000 | Dietrich et al. ....................... 188/156 |
| 6,139,460 | * 10/2000 | Drennen et al. ................. 188/162 X |

FOREIGN PATENT DOCUMENTS

| 31 45 217 | 5/1983 | (DE) . |
| 195 11 287 | 1/1996 | (DE) . |
| 195 43 098 | 12/1996 | (DE) . |
| 195 45 379 | 4/1997 | (DE) . |
| 196 05 988 | 9/1997 | (DE) . |
| 0 743 470 | 11/1996 | (EP) . |
| 1 048 011 | 11/1966 | (GB) . |
| 2 199 097 | 6/1988 | (GB) . |
| 88 04741 | 6/1988 | (WO) . |
| 97 11287 | 3/1997 | (WO) . |

* cited by examiner

*Primary Examiner*—Pam Rodriguez
(74) *Attorney, Agent, or Firm*—Rader, Fishman & Grauer PLLC

(57) ABSTRACT

The present invention discloses an electromechanically operable disc brake for automotive vehicles which is comprised of a floating caliper and an actuating unit arranged on the caliper. The actuating unit includes an electric motor which, by the intermediary of a threaded roller pinion with return of the threaded rollers, readjusts an actuating element in which one of two friction linings which are mounted displaceably in the brake caliper is moved into engagement with a brake disc.

Especially with a view to minimizing the influence of disturbing forces and moments, the spindle of the threaded roller pinion is drivable by the electric motor and the actuating element is formed by the threaded nut of the threaded roller pinion according to the present invention.

12 Claims, 3 Drawing Sheets

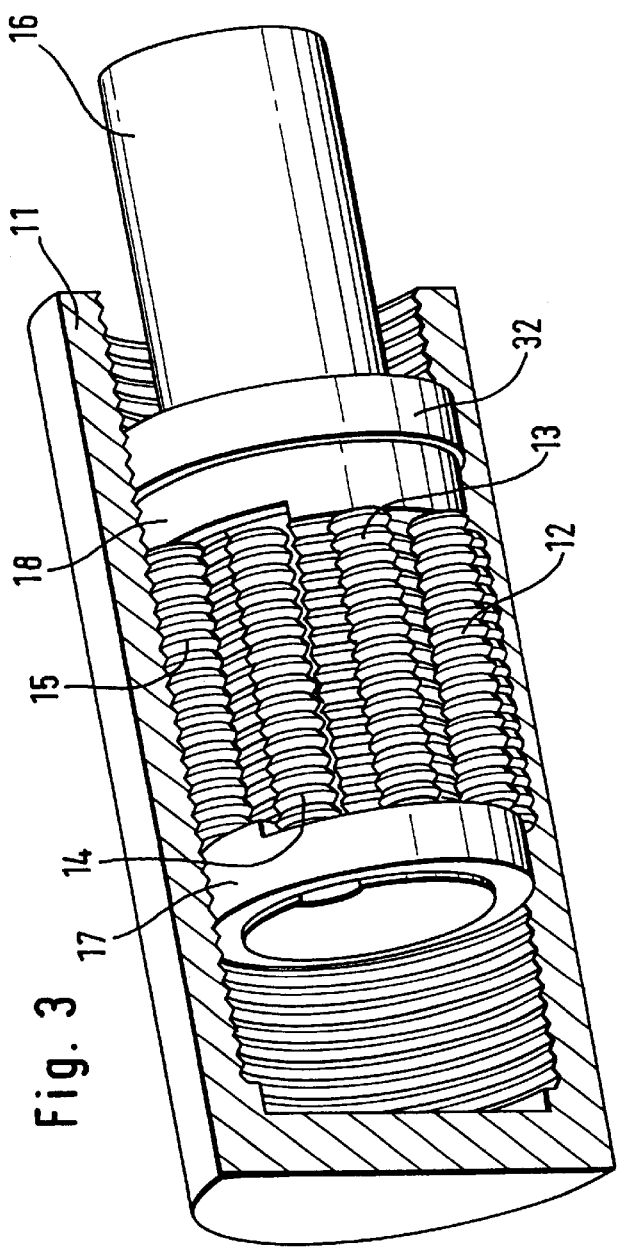
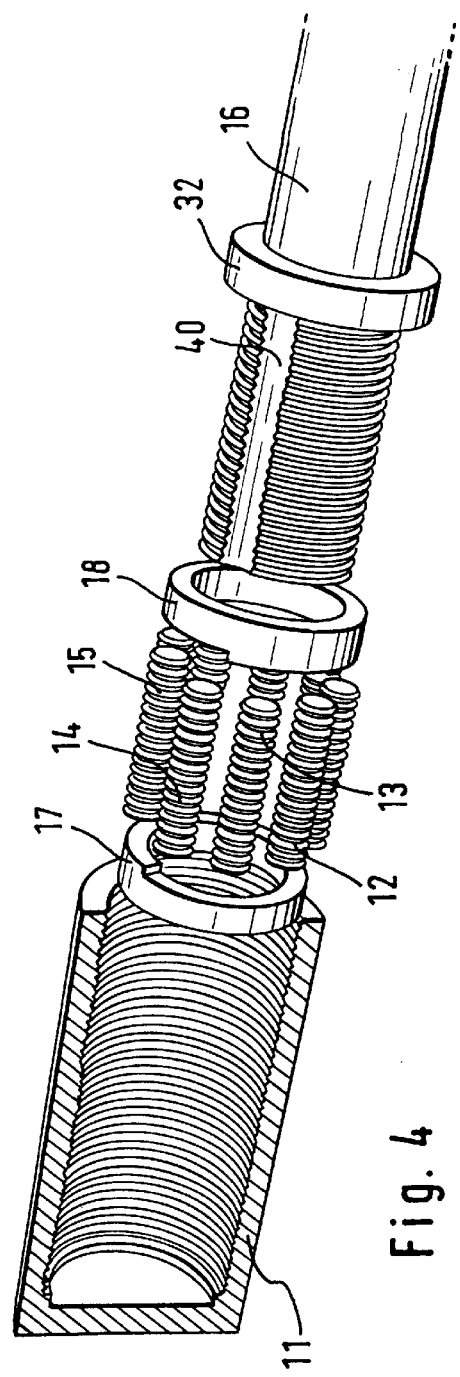
Fig. 3
Fig. 4

ELECTROMECHANICALLY OPERATED DISK BRAKE

TECHNICAL FIELD

The present invention generally relates to vehicle brakes and more particularly relates to an electromechanically operable disc brake for automotive vehicles.

BACKGROUND OF THE INVENTION

An electromechanically operable disc brake of this type is e.g. disclosed in German patent application No. 195 11 287. The actuating unit of the prior art disc brake comprises an electric motor, an actuating element, and a reduction gear that is interposed between the electric motor and the actuating element and configured as a threaded roller pinion with a return arrangement of the threaded rollers. The friction lining associated with the actuating unit is moved into engagement with the brake disc by an axial displacement of the spindle of the threaded roller pinion. In the prior art disc brake, the actuating element is the spindle of the threaded roller pinion having a threaded nut which is driven by the electric motor to produce a corresponding tensional force. It is disadvantageous in the prior art electromechanically operable disc brake that the spindle is considerably loaded by transverse forces which are caused especially when large displacement travels occur (worn out Brake linings) and which are due to the effect of circumferential forces of the lining and the expansion of the brake caliper which occurs when the actuating unit is actuated.

Therefore, an object of the present invention is to improve an electromechanically operable disc brake of the type mentioned hereinabove to the end that the influence of disturbing forces and moments is eliminated.

According to the present invention, this object is achieved in that the spindle of the threaded roller pinion is drivable by the electric motor and the actuating element is provided by the threaded nut of the threaded roller pinion. An accordingly configured electromechanically operable disc brake is characterized by a high degree of efficiency and an extremely compact construction which is rendered possible by a very short and rigid design of the spindle permitting high mass-related brake torques.

To render the idea of the present invention more precise, the reduction gear is mounted in the brake caliper.

In a particularly favorable aspect of the object of the present invention, cam plates which cooperate with the threaded rollers are rigidly coupled to the spindle, and a groove is provided in the spindle which is used for the return of the threaded rollers.

To considerably reduce the necessary drive torque that is to be generated by the electric motor, the force transmission between the electric motor and the spindle is carried out by way of a planetary gear.

The sun wheel of the planetary gear is preferably the rotor of the electric motor. The planet pinions are in engagement with an internal toothing system, that is configured in the housing of the actuating unit and provides the hollow wheel of the planetary gear, and are arranged on a planet pinion carrier which cooperates with the spindle.

In another favorable aspect of the present invention, the force transmission between the rotor of the electric motor and the spindle is effected by way of a longitudinal shaft serration.

In another favorable embodiment of the present invention, a rotation-preventing mechanism is provided between the actuating element and the first friction lining. As a rotation-preventing mechanism, a lining-retaining spring can be used, for example, which is fitted to friction linings envisaged for application in hydraulically operable disc brakes.

BRIEF DESCRIPTION OF THE DRAWINGS

FIG. 3 is a partial cross-sectional view of a detailed illustration of the threaded roller pinion used in the brake of the FIGS. 1 or 2 embodiment.

FIG. 4 is an exploded view of the threaded roller pinion of the FIG. 3 embodiment.

DETAILED DESCRIPTION OF THE PREPARED EMBODIMENTS

Figure 1:
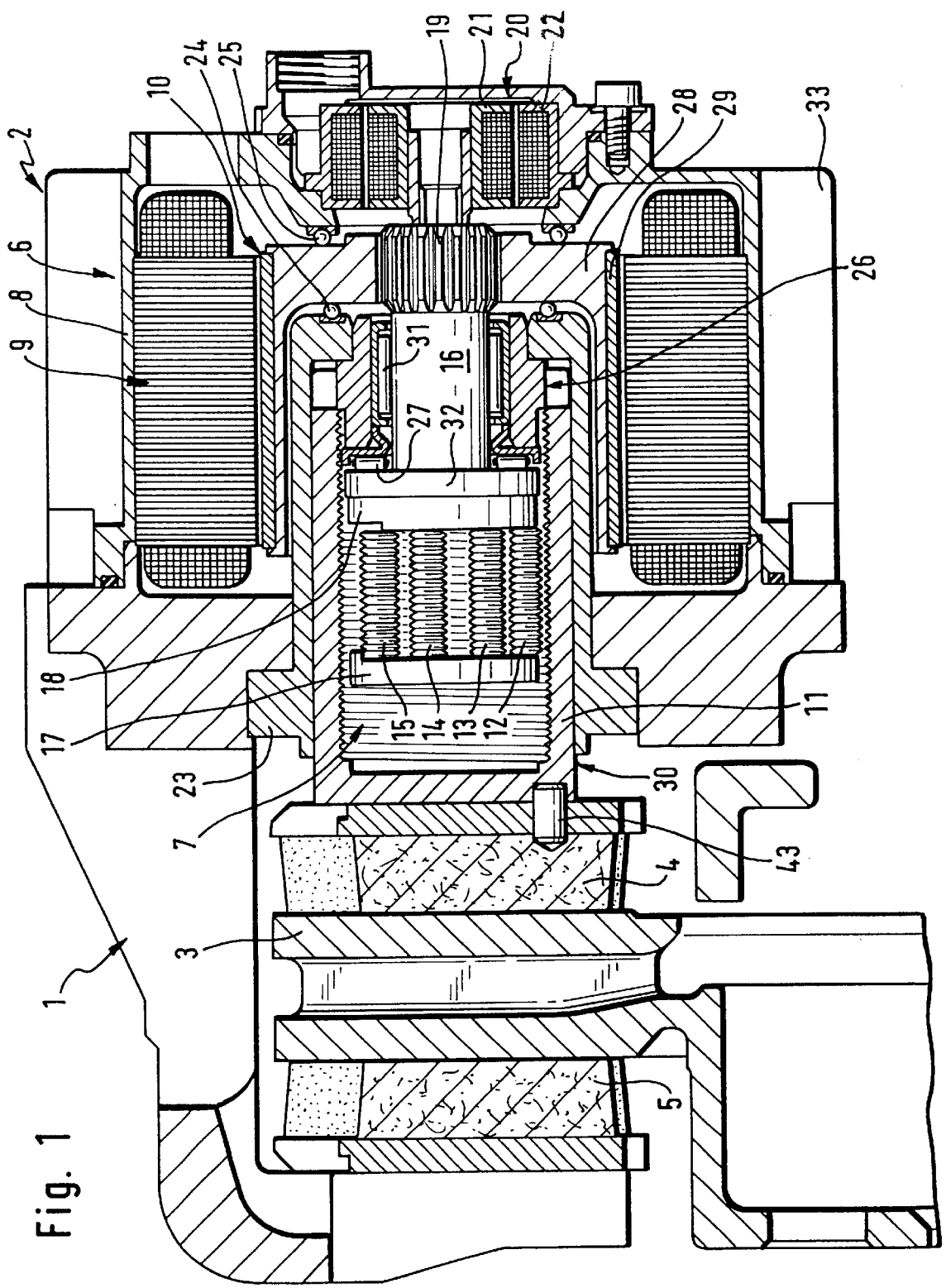
FIG. 1 is an axial cross-sectional view of a first embodiment of the electromechanically operable disc brake of the present invention.

The electromechanically operable disc brake of the present invention, as shown in the drawings, which is configured as a floating-caliper disc brake in the present example, is basically comprised of a brake caliper 1 that is slidably mounted in a stationary holder (not shown), and an actuating unit 2 whose housing 8 is arranged on the brake caliper 1 by way of attachment elements (not shown). A pair of friction linings 4 and 5 is arranged in the brake caliper 1 so that they face the right and the left lateral surface of a brake disc 3.

The friction lining 4 shown on the right-hand side in the drawing is referred to as first friction lining and the other friction lining, designated by reference numeral 5, is referred to as second friction lining hereinbelow.

While the first friction lining 4 is directly movable into engagement with the brake disc 3 by the actuating unit 2 by way of an actuating element 30, the second friction lining 5 is urged against the opposite lateral surface of the brake disc 3 by the effect of a reaction force generated by the brake caliper 1 upon actuation of the assembly.

The actuating unit 2 mentioned hereinabove comprises an electric motor 6 which, in the embodiment shown, is configured as an electronically commutable torque motor energized by a permanent magnet and having a stator 9 that is immovably arranged in the housing 8 and a rotor 10 or hollow shaft which is provided by an annular carrier 28 carrying several permanent magnet segments 29. Interposed in terms of effect between the torque motor 6 and the above-mentioned actuating element 30, which is preferably arranged coaxially to the motor 6, is a reduction gear 7 which is configured as a threaded roller pinion 11 to 16 with an axial return of the threaded rollers in the embodiment shown. The threaded roller pinion generally includes a threaded nut 11 and a threaded spindle 16. In the threaded nut 11, threaded rollers 12, 13, 14, 15 are paraxially accommodated which rotate in a planetary fashion upon a rotational movement of the spindle 16 and cause an axial movement of the threaded nut 11. Two cam plates 17 and 18 which are rigidly coupled to the spindle 16 ensure the transfer (return movement) of the threaded rollers 12, 13, 14, 15.

The arrangement is preferably chosen so that the rotor 10 of the torque motor 6 is unrotatably connected to the spindle 16, for example, by way of a longitudinal shaft serration 19. The above-mentioned actuating element 30 is formed by the threaded nut 11 whose end surface facing the first friction lining 4 is in axial abutment with the latter. Between the threaded nut 11 and the first friction lining 4, preferably, a rotation-preventing mechanism 43 is provided which is configured as a pin pressed into the friction lining 4 and received in a recess in. the end surface of the threaded nut 11. To guide the reduction gear 7 or its threaded nut 11 in the brake caliper 1, a cylindrical guide portion 23 is used which is rigidly coupled to the brake caliper 1 or designed in the brake caliper 1. Rotor 10 is supported on guide portion 23 by the intermediary of an axial bearing 24. On the other side, rotor 10 is supported on a second axial bearing 25 that is fixed in the housing 8. A combined bearing assembly 26 which is arranged on the end of the guide portion 23, shown on the right-hand side in the drawing, is used as a mounting support of the spindle 16 both in the axial and the radial direction. The combined bearing assembly 26 is preferably provided by an axial bearing 27 and a radial (needle) bearing 31. In abutment with the axial bearing 27 is a front surface of a bead 32 which is designed proximate the cam plate 18 on the spindle 16, and the end of the spindle 16 which projects from the threaded nut 11 is guided in the radial bearing 31.

In order to exactly position the threaded roller pinion 7 and to produce control signals for an electronic commutation of the torque motor 6, a non-contact transducer, a so-called resolver 20, is accommodated in the housing 8 of the actuating unit 2. In the embodiment shown, the resolver 20 includes two rings 21, 22 which carry electrical windings and are coaxially spaced from each other by an air gap. The radially inward ring 21 is connected to the spindle 16, while the other ring, i.e., the radially outward ring 22, is unrotatably arranged in the housing 8.

Housing 8 has large-surface cooling flanges 33 in order to effectively conduct the heat that is produced during operation of the torque motor 6 to the atmosphere.

Figure 2:
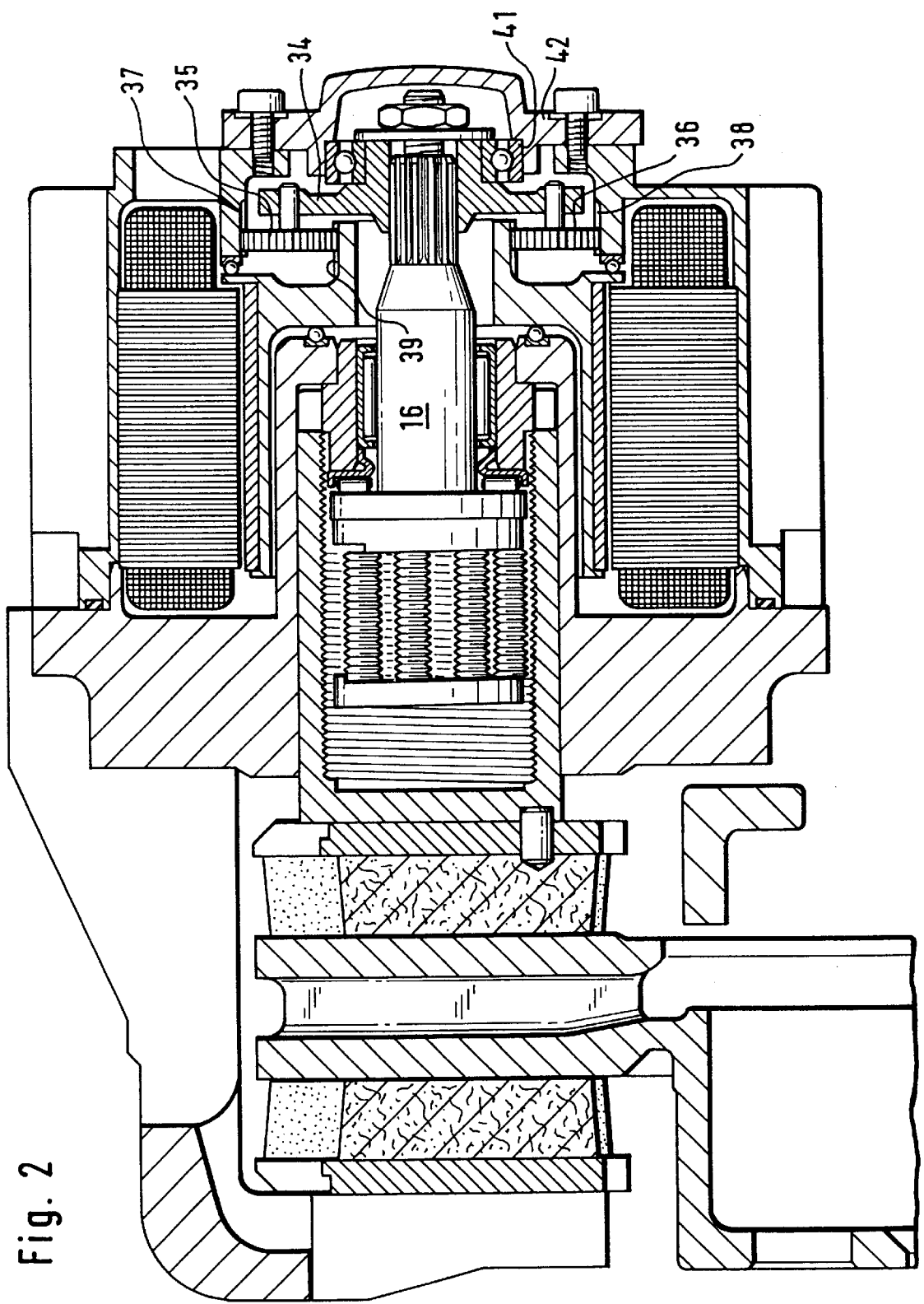
FIG. 2 is a view of a second embodiment of the electromechanically operable disc brake in an illustration which corresponds to FIG. 1.

In the second embodiment of the object of the present invention shown in FIG. 2, the necessary engine torque is reduced by an expedient integration of a planetary gear 34, 35, 36, 37. The planetary gear which is interposed between the rotor 10 and the threaded spindle 16 in terms of effect is comprised of a sun wheel which is formed of a toothed area 39 at the end of the rotor 10, a plurality of planet pinions, two of which are illustrated and designated by reference numerals 35 and 36, a hollow wheel 37 which is provided by an inside toothing 38 configured in the brake caliper 1, and a pinion wheel carrier 34 which is preferably attached to the end of the spindle 16. The mounting support of the pinion wheel carrier 34 in the housing 8 of the actuating unit 2 is effected by means of a radial bearing 41 which is arranged in a cover 42 that closes the housing 8.

As has already been mentioned in connection with the embodiments shown in FIGS. 1 and 2, the reduction gear 7 illustrated in FIGS. 3 and 4 is configured as a threaded roller pinion with an axial return of the threaded rollers 12 to 15 which are arranged in an annular chamber defined between the threaded nut 11 and the threaded spindle 16. The threaded rollers 12 to 15 move in their recirculation subsequently into an axial groove 40 designed in the threaded spindle 16 so that they are disengaged from the threaded nut 11 and from the spindle thread as well. The axial return of the threaded rollers 12 to 15 to their initial point is controlled by the above-mentioned cam plates 17, 18 which are rigidly connected to the spindle 16 and reset the rollers after each recirculation in the threaded nut 11.

What is claimed is:

1. An electromechanically operable disc brake caliper system for automotive vehicles, comprising:
    a brake caliper,
    an actuating unit arranged on the brake caliper, the actuating unit including an electric motor arranged coaxially with an actuating element, the actuating element comprising a threaded roller pinion including a threaded nut, a threaded spindle driven by the electric motor and having an axial groove, a pair of cam plates rigidly coupled to the threaded spindle, and one or more threaded rollers interposed between the threaded nut and the threaded spindle, wherein rotational movement of the threaded spindle by the electric motor causes the one or more threaded rollers to rotate in a planetary fashion in the axial groove of the threaded spindle and axial movement of the threaded nut, thereby causing axial movement of the brake caliper.

2. The electromechanically operable disc brake caliper system as claimed in claim 1, wherein the actuating element, the threaded roller pinion, and the one or more threaded rollers form a reduction gear, and wherein said reduction gear is mounted within an opening of the brake caliper.

3. The electromechanically operable disc brake caliper system as claimed in claim 1, further including a planetary gear system disposed between the electric motor and the threaded spindle.

4. The electromechanically operable disc brake caliper system as claimed in claim 3, wherein said planetary gear system includes a sun wheel provided on a rotor of the electric motor, and wherein said planetary gear system further includes planet pinions arranged on a planet pinion carrier cooperating with the threaded spindle.

5. The electromechanically operable disc brake caliper system as claimed in claim 1, further including a longitudinal shaft serration for unrotatably connecting a rotor of the electric motor to the threaded spindle.

6. The electromechanically operable disc brake caliper system as claimed in claim 1, further including a rotation-preventing mechanism interposed between the threaded nut and the brake caliper.

7. An electromechanically operable disc brake caliper system for automotive vehicles, comprising:
    a brake caliper,
    an actuating unit arranged on the brake caliper, the actuating unit including an electric motor arranged coaxially with an actuating element, the actuating element comprising a threaded roller pinion including a threaded nut, a threaded spindle driven by the electric motor and having an axial groove, a pair of cam plates rigidly coupled to the threaded spindle, and one or more threaded rollers interposed between the threaded nut and the threaded spindle, wherein rotational movement of the threaded spindle by the electric motor causes the one or more threaded rollers to rotate in a planetary fashion in the axial groove of the threaded spindle and axial movement of the threaded nut, thereby causing the one or more threaded rollers to engage and disengage from the threaded nut and the threaded spindle.

8. The electromechanically operable disc brake caliper system as claimed in claim 7, wherein the actuating element, the threaded roller pinion, and the one or more threaded rollers form a reduction gear, and wherein said reduction gear is mounted within an opening of the brake caliper.

9. The electromechanically operable disc brake caliper system as claimed in claim 7, further including a planetary gear system disposed between the electric motor and the threaded spindle.

10. The electromechanically operable disc brake caliper system as claimed in claim 9, wherein said planetary gear system includes a sun wheel provided on a rotor of the electric motor, and wherein said planetary gear system further includes planet pinions arranged on a planet pinion carrier cooperating with the threaded spindle.

11. The electromechanically operable disc brake caliper system as claimed in claim 7, further including a longitudinal shaft serration for unrotatably connecting a rotor of the electric motor to the threaded spindle.

12. The electromechanically operable disc brake caliper system as claimed in claim 7, further including a rotation-preventing mechanism interposed between the threaded nut and the brake caliper.

* * * * *